(12) United States Patent
Kawaguchi

(10) Patent No.: US 6,274,815 B1
(45) Date of Patent: Aug. 14, 2001

(54) CIRCUIT MEMBER-HOLDING CLAMP AND METHOD OF PRODUCING SAME

(75) Inventor: Kenichiro Kawaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/325,416

(22) Filed: Jun. 4, 1999

(30) Foreign Application Priority Data

Jun. 5, 1998 (JP) .................................................. 10-157612

(51) Int. Cl.$^7$ ....................................................... H02G 3/04
(52) U.S. Cl. ................................... 174/72 A; 174/72 TR
(58) Field of Search ........................... 439/718; 174/72 A, 174/72 TR, 117 F, 95

(56) References Cited

U.S. PATENT DOCUMENTS

| | | | |
|---|---|---|---|
| 4,300,284 | * 11/1981 | Reeder | 174/112 |
| 4,375,379 | * 3/1983 | Luetzow | 174/72 TR |
| 4,874,908 | * 10/1989 | Johansson | 174/72 A |

FOREIGN PATENT DOCUMENTS

| | | |
|---|---|---|
| 3616649 A1 | 11/1987 | (DE) . |
| 0 298 744 A1 | 1/1989 | (EP) . |
| 7-231538 | 8/1995 | (JP) . |
| 7-231539 | 8/1995 | (JP) . |

* cited by examiner

Primary Examiner—Shawn Riley
(74) Attorney, Agent, or Firm—Morgan, Lewis & Bockius LLP

(57) ABSTRACT

A circuit member-holding clamp ($A_1$) is formed of a flexible resin material molded on a plurality of juxtaposed circuit members (W) in intersecting relation thereto, and the circuit member-holding clamp has such a configuration that a plurality of tubular portions (10), respectively surrounding the circuit members (W), are integrally connected together. Preferably, a thin wall portion (11) is formed between any two adjacent tubular portions (10). In a method of producing the circuit member-holding clamp ($A_1$), the plurality of circuit members are inserted in a mold, and a flexible resin material is poured into the mold.

39 Claims, 5 Drawing Sheets

CIRCUIT MEMBER-HOLDING CLAMP AND METHOD OF PRODUCING SAME

BACKGROUND OF THE INVENTION

1. Field of the Invention

The present invention relates to a circuit member-holding clamp for holding a plurality of circuit members (such as wires) in a parallel, juxtaposed manner, and for being fixedly secured to a wall when installing these circuit members. This invention also relates to a method of producing this circuit member-holding clamp.

The present application is based on Japanese Patent Application No. Hei. 10-157612, which is incorporated herein by reference.

2. Description of the Related Art

FIG. 7 shows the related wire holding clamp (see Unexamined Japanese Patent Publication No. 7-231538) for holding a plurality of wires in a juxtaposed manner and for being fixedly secured to a wall.

This wire holding clamp A is molded of a synthetic resin, and a lid 3 is connected to one end of a base plate 1 through a flexible hinge 2. When the lid 3 is closed, a lock hole 5, formed in a lock member 4 formed at one end of the lid 3, is engaged with a lock pawl 6 formed on the other end of the base plate 1.

A plurality of support legs 7 are formed upright on an inner surface of the base plate 1 in a juxtaposed manner, and roof-like wire introducing portions 8 are formed on distal ends of the support legs 7, respectively.

The lid 3 is first opened, and then a wire W is pressed against the adjacent wire introducing portions 8, and as a result the wire introducing portions 8, thus pressed by the wire W, are elastically deformed to allow the passage of the wire W, so that the wire W is inserted between the support legs 7 (see FIG. 8).

The gap between the adjacent wire introducing portions 8 is smaller than the diameter of the wire W, and therefore even if a force, tending to disengage the wire from the clamp, acts on the wire, the wire will not be disengaged from the clamp, and is kept retained between the support legs 7.

After all the wires are inserted, the lid 3 is closed, so that the lock member 4 is engaged with the lock pawl 6. Then, a clip 9 (see FIG. 8), formed on an outer surface of the base plate 1, is pressed against a hole portion formed in a mounting portion of a wall, so that a distal end portion of the clip 9 is elastically compressed, and is passed through this hole. This distal end portion, when passed through the hole, is elastically restored, and therefore the wire holding clamp A is fixedly secured to the wall.

The wire holding clamp A need to have rigidity enough to retain the wires, and the clip 9, formed integrally with this clamp, also need to have sufficient rigidity to be fixedly secured to the wall so as to support the wire holding clamp A on the wall.

However, the wall, on which the wires W are to be installed or mounted, does not always have a flat surface. When the wire holding clamp A is to be mounted on a curved wall B as shown in FIG. 9, this mounting operation can not be easily carried out, and besides there are encountered problems that the wire holding clamp A lifts off the wall B, so that a gap or space is formed between the clamp A and the wall B, that a foreign matter is liable to be caught by the wire holding clamp A projecting from the wall B, and that the installation of the wires W is difficult if the installation space is narrow.

SUMMARY OF THE INVENTION

This invention seeks to solve the above problems, and an object of the present invention is to provide a circuit member (e.g. wire)-holding clamp which can be mounted on a wall surface without any problem even if this wall surface is curved. Another object of the present invention is to provide a method of producing the circuit member-holding clamp.

According to the first aspect of the present invention, there is provided a circuit member-holding clamp, for securing a plurality of juxtaposed circuit members to a wall, comprising a plurality of tubular portions respectively surrounding-circuit members which are juxtaposed, the tubular portions being integrally connected together, wherein the circuit member-holding clamp is formed of a flexible resin material molded on the circuit members in an intersecting direction thereto.

According to the second aspect of the present invention, the circuit member-holding clamp may further comprises a thin wall portion formed between any two adjacent ones of the circuit members.

According to the third aspect of the present invention, preferably, the flexible resin material is a resin having hardness of approximately 60 to 80 degrees according to "JIS K6301".

According to the fourth aspect of the present invention, the circuit member-holding clamp may further comprises at least two flat mounting piece portions respectively formed on utmost opposite ends of the tubular portions.

According to the fifth aspect of the present invention, preferably, the tubular portions are juxtaposed to connect tubular walls thereof integrally with each other.

According to the sixth aspect of the present invention, there is provided a method of producing a circuit member-holding clamp. First, a plurality of juxtaposed circuit members are placed on a mating surface of a lower die. Next, a flexible resin material is poured into a cavity in the lower die. Then, an upper die is placed on the mating surface of the lower die. As a result of the method, the circuit members are insert molded in the flexible resin material between the upper and lower dies.

According to the seventh aspect of the present invention, there is provided a method of producing a circuit member-holding clamp. First, a plurality of juxtaposed circuit members are passed through mating surfaces of upper and lower dies mated together. Then, a flexible resin material is poured into a cavity formed by the upper and lower dies. As a result of the method, the circuit members insert molded in the flexible resin material molded in the cavity.

DETAILED DESCRIPTION OF THE PREFERRED EMBODIMENTS

A preferred embodiment of the present invention will now be described with reference to the drawings. The construction of a circuit member-holding clamp $A_1$ of the present invention, a method of use thereof, and a method of producing the circuit member-holding clamp $A_1$ will be described in this order.

Figure 1:
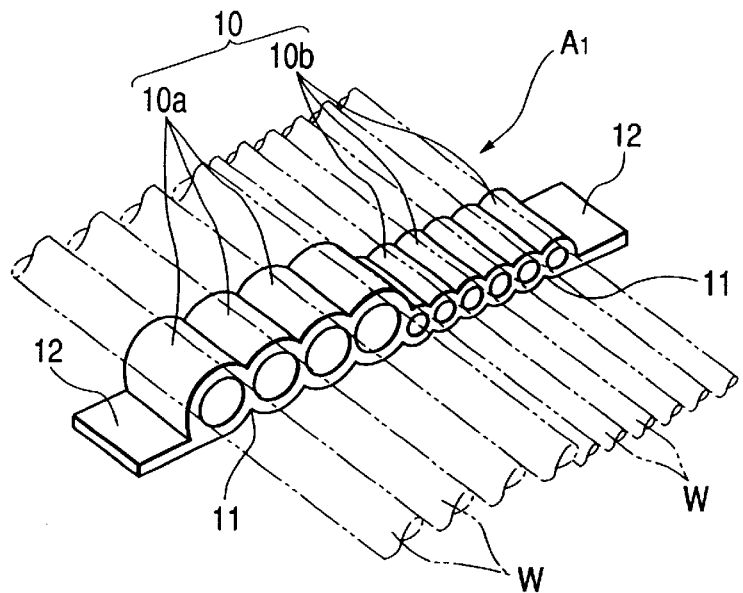
FIG. 1 is a perspective view of a circuit member-holding clamp of the present invention.
Figure 2:
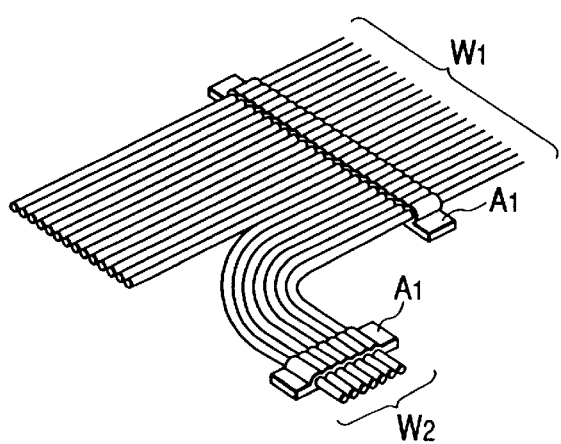
FIG. 2 is a perspective view showing wires bundled by circuit member-holding clamps of the present invention.
Figure 3:
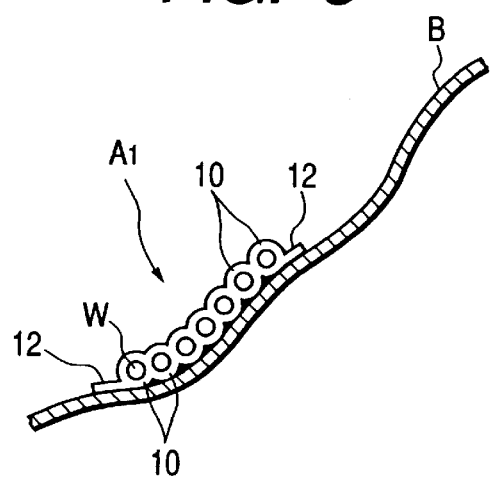
FIG. 3 is a side-elevational view showing the circuit member-holding clamp of the present invention mounted on a curved wall.

FIG. 1 is a perspective view of the circuit member-holding clamp $A_1$ for holding wires, FIG. 2 is a perspective view showing wires bundled by circuit member-holding clamps $A_1$, and FIG. 3 is a side-elevational view showing the circuit member-holding clamp $A_1$ mounted on a curved wall B.

As shown in FIG. 1, the circuit member-holding clamp $A_1$ is formed of a flexible resin material molded on a plurality of juxtaposed wires W in intersecting relation thereto, and this circuit member-holding clamp $A_1$ is connected integrally to the wires W.

The flexible resin material is a resin having hardness of about 60 to about 80 degrees (see JIS K6301), and for example, an elastomer is used as this resin material.

The circuit member-holding clamp $A_1$ has such a configuration that a plurality of tubular portions 10, each surrounding the outer peripheral surface of the associated wire W, are integrally connected together, and a thin wall portion 11 is formed between any two adjacent wires W.

Therefore, the circuit member-holding clamp $A_1$ can be easily flexibly deformed in its longitudinal direction intersecting the wires W.

The circuit member-holding clamp $A_1$ of FIG. 1 includes four tubular portions 10a, respectively surrounding the wires of a larger diameter, and six tubular portions 10b respectively surrounding the wires of a smaller diameter, and flat mounting piece portions 12 are formed at opposite ends of the circuit member-holding clamp $A_1$, respectively.

FIG. 2 shows an example of a wire bundle in which a plurality of wires $W_2$, forming a branch, branch off from a plurality of wires $W_1$ forming a trunk. The trunk wires $W_1$ are held in a juxtaposed manner by a circuit member-holding clamp $A_1$, and the branch wires $W_2$ are held in a juxtaposed manner by another circuit member-holding clamp $A_1$ of a different size.

The circuit member-holding clamp $A_1$, holding the wires W, can be easily flexibly deformed, and therefore can be held in intimate contact with the curved surface of the wall B, and can be fixedly secured to the wall by an adhesive coated on the mounting piece portions 12 and the tubular portions 10 (see FIG. 3).

Therefore, even if the wall B has any curved shape, the circuit member-holding clamp $A_1$ can be easily held in intimate contact with the wall B, and will not lift off the surface of the wall B.

Figure 4:
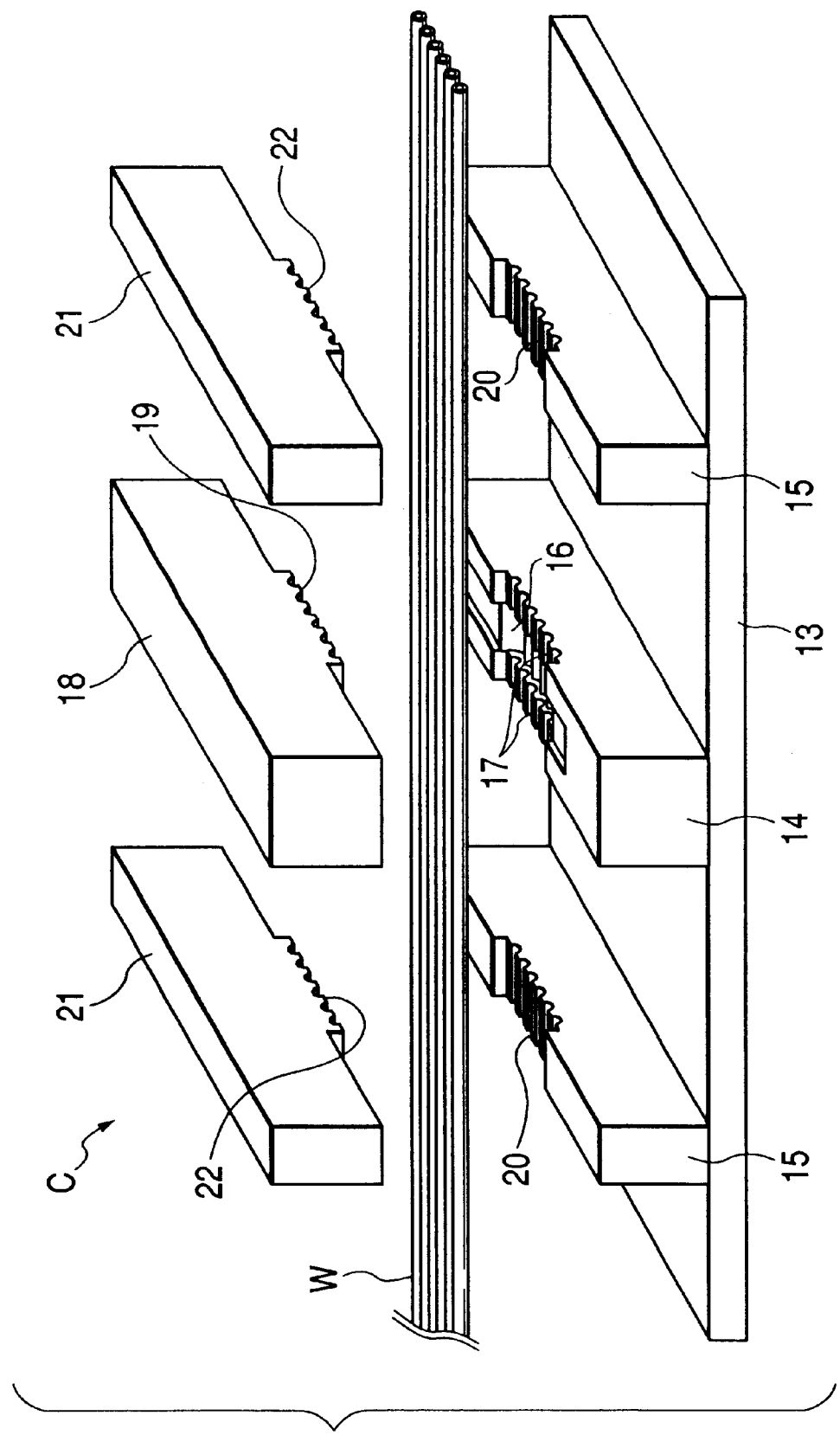
FIG. 4 is a perspective view showing an initial stage of a circuit member-holding clamp producing method of the present invention.
Figure 5:
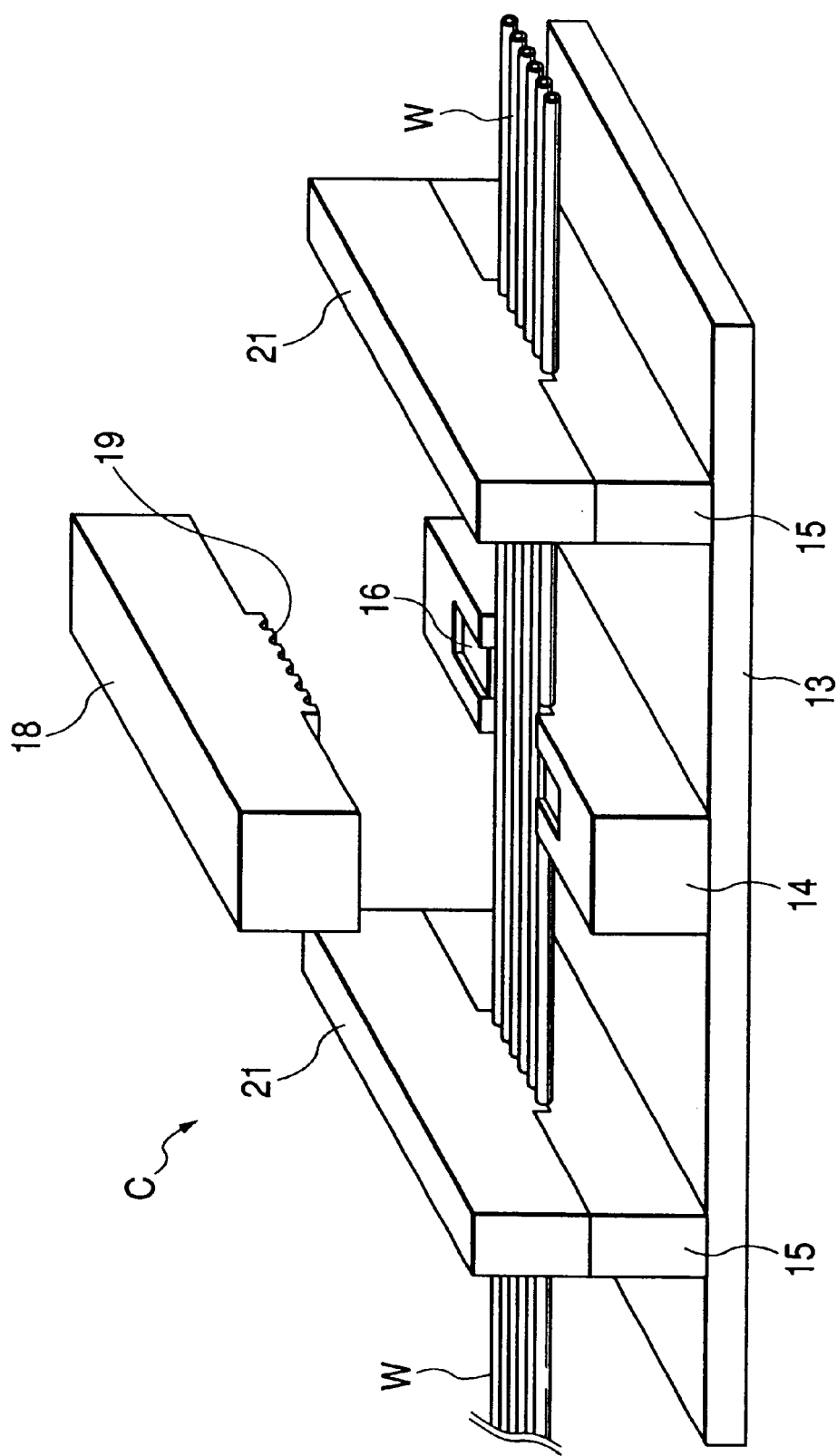
FIG. 5 is a perspective view showing a wire holding-stage of the circuit member-holding clamp producing method of the present invention.
Figure 6:
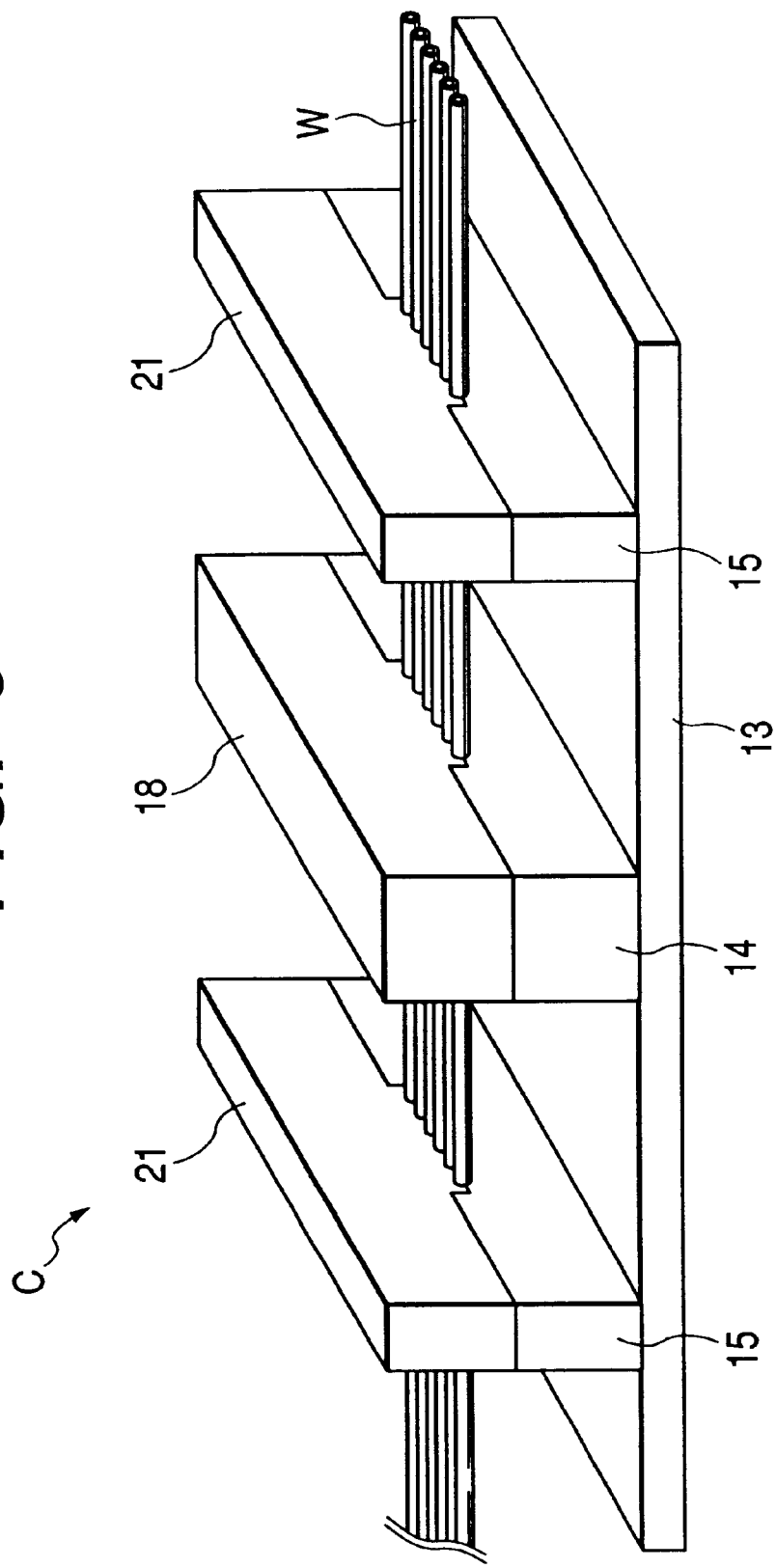
FIG. 6 is a perspective view showing a final stage of the circuit member-holding clamp producing method of the present invention.
Figure 7:
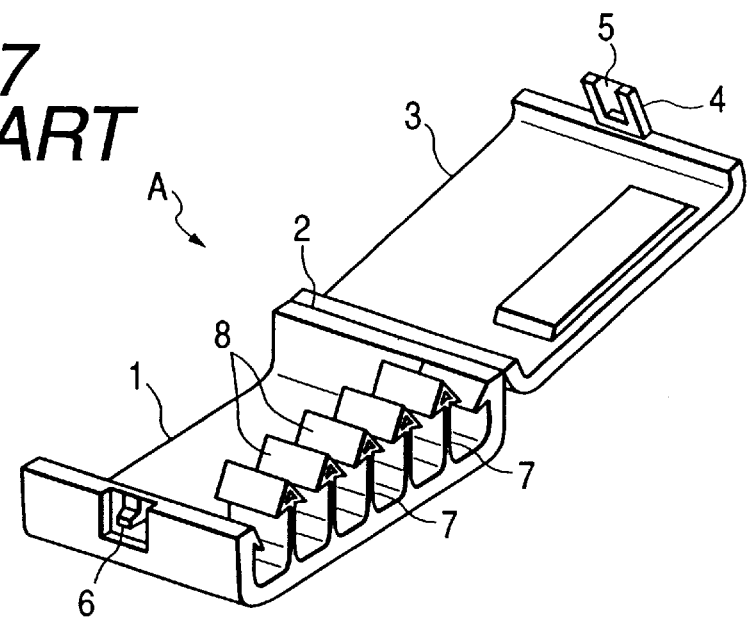
FIG. 7 is a perspective view of the related circuit member-holding clamp.
Figure 8:
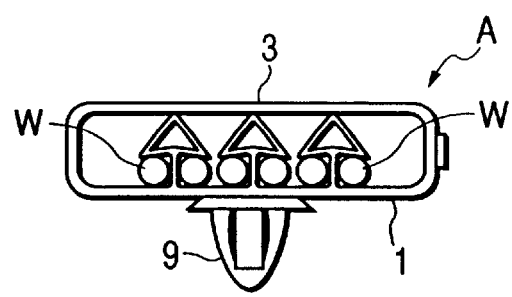
FIG. 8 is a side-elevational view of the circuit member-holding clamp in its closed condition.
Figure 9:
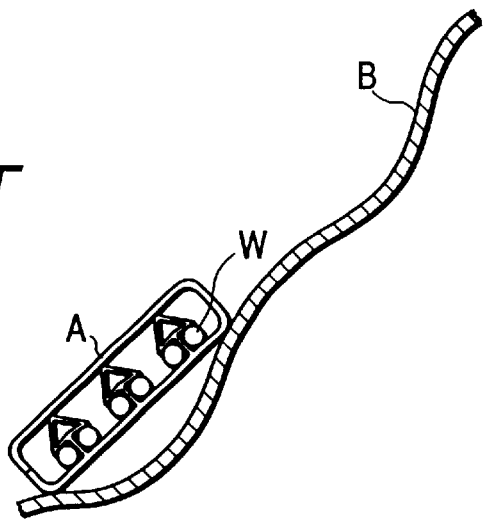
FIG. 9 is a side-elevational view showing the related circuit member-holding clamp mounted on a curved wall.

FIGS. 4 to 6 are perspective views explanatory of a method of producing the circuit member-holding clamp $A_1$ by a producing apparatus C.

In the producing apparatus C, a lower die 14 of a mold is fixedly mounted on a generally central portion of an upper surface of a base 13, and lower support members 15 are fixedly mounted on the upper surface of the base 13, and are disposed respectively on opposite sides of the lower die 14.

A cavity 16 for molding a lower half of the circuit member-holding clamp $A_1$ is formed in a central portion of an upper surface of the lower die 14 of the mold, and a plurality of passage grooves 17 for the wires W are formed at each side of the cavity 16.

An upper die 18 has a lower surface (mating surface) which is to be mated with the lower die 14, and a cavity (not shown) for molding an upper half of the circuit member-holding clamp $A_1$ is formed in a central portion of this lower surface, and a resin injection passage (not shown) communicates with this cavity.

Passage grooves 19 to be opposed respectively to the passage grooves 17 are formed at each side of the cavity. When the upper die 18 is mated with the lower die 14, wire passage holes each holding the associated wire W are formed by the passage grooves 17 and 19.

Passage grooves 20, aligned respectively with the passage grooves 17, are formed in an upper surface of each of the lower support member 15. Passage grooves 22 to be opposed respectively to the passage grooves 20 are formed in a lower surface of each of upper support members 21 which is to be mated with the upper surface of the associated lower support member 15.

For producing the circuit member-holding clamp $A_1$ by the producing apparatus C of the above construction, the upper die 18 and the upper support members 21 are removed as shown in FIG. 4, and in this condition the wires W are put in the respective passage grooves 17 in the lower die 14 and also in the respective passage grooves 20 in each lower support member 15.

Then, the upper support members 21 are superposed on the lower support members 15, respectively, and a clamping force is applied to the support members 15 and 21 by a known clamping device (not shown) or the like, so that each wire W is held between the associated passage grooves 20 and 22.

At this time, the wires W are not loose, but are kept tense.

If the flexible resin material to be injected into the mold has poor flowability, the flexible resin material can be poured into the cavity 16 in the lower die 14 in an amount sufficient to fill the cavity in the upper die 18 before superposing the upper die 18 on the lower die, and then the upper die 18 can be superposed on the lower die.

If the flexible resin material has good flowability, the upper die 18 is superposed on the lower die, and then the resin is injected into the cavity 16 and the cavity in the upper die through the resin injection passage in the upper die 18 (see FIG. 6).

When the flexible resin material thus poured and solidified is removed from the mold, there is obtained the circuit member-holding clamp $A_1$ integrally connected to the wires W.

In the above embodiment, the plurality of wires W are inserted in the mold for forming the circuit member-holding clamp $A_1$, and the molding is carried out, thereby integrally connecting the wires to the molded clamp. However, for example, circuit members such as bus bars can be insert molded, thereby integrally connecting the bus bars to the molded clamp.

The present invention has the above construction, and therefore the following advantageous effects are achieved.

(1) The circuit member-holding clamp can be easily flexibly deformed, and therefore can be easily fixedly secured to a wall even if the wall has a curved surface.

There are not encountered problems that the circuit member-holding clamp, fixedly secured to the wall, lifts off the wall and that a gap is formed between the two.

(2) The plurality of wires are insert molded in the circuit member-holding clamp, and therefore are integrally connected to the circuit member-holding clamp. Therefore, the wires will not be displaced and shaken with respect to the circuit member-holding clamp.

(3) The circuit member-holding clamp has a simple construction, and therefore has an advantage that it can be provided at a low cost.

And besides, the circuit member-holding clamp has a compact construction, and therefore is suitably used for installing the wires in a narrow space.

What is claimed is:

1. A circuit member-holding clamp, for securing a plurality of juxtaposed circuit members to a wall, comprising a plurality of tubular portions respectively surrounding the juxtaposed circuit members, the tubular portions having juxtaposed tubular walls being integrally connected together, and each tubular portion enclosing a respective one of the circuit members, wherein the circuit member-holding clamp is formed of a flexible resin material molded on the circuit members in an intersecting direction thereto.

2. The circuit member-holding clamp of claim 1, further comprising a thin wall portion formed between any two adjacent ones of the circuit members.

3. A circuit member-holding clamp, for securing a plurality of juxtaposed circuit members to a wall, comprising a plurality of tubular portions respectively surrounding the juxtaposed circuit members, the tubular portions being integrally connected together, wherein the circuit member-holding clamp is formed of a flexible resin material molded on the circuit members in an intersecting direction thereto, and wherein the flexible resin material is a resin having hardness of approximately 60 to approximately 80 degrees according to JIS standard "JIS K6301".

4. The circuit member-holding clamp of claim 1, further comprising at least two flat mounting piece portions respectively formed on utmost opposite ends of the tubular portions.

5. A method of producing a circuit member-holding clamp for securing a plurality of juxtaposed circuit members to a wall, the circuit member-holding clamp comprising a plurality of tubular portions respectively surrounding the juxtaposed circuit members, the tubular portions being integrally connected together, the method comprising:

placing the plurality of juxtaposed circuit members on a mating surface of a lower die;

pouring a flexible resin material into a cavity in the lower die;

after the pouring step, placing an upper die on the mating surface of the lower die, whereby insert molding the circuit members in the flexible resin material between the upper and lower dies; and enclosing each circuit member by a respective one of the tubular portions.

6. A method of producing a circuit member-holding clamp for securing a plurality of juxtaposed circuit members to a wall, the circuit member-holding clamp comprising a plurality of tubular portions respectively surrounding the juxtaposed circuit members, the tubular portions being integrally connected together, the method comprising:

passing the plurality of juxtaposed circuit members through mating surfaces of upper and lower dies mated together;

after the passing step, pouring a flexible resin material into a cavity formed by the upper and lower dies, whereby insert molding the circuit members in the flexible resin material molded in the cavity; and enclosing each circuit member by a respective one of the tubular portions.

7. A method of producing a circuit member-holding clamp, comprising:

placing the plurality of juxtaposed circuit members on a mating surface of a lower die;

pouring a flexible resin material into a cavity in the lower die;

after the pouring step, placing an upper die on the mating surface of the lower die, whereby insert molding the circuit members in the flexible resin material between the upper and lower dies; and enclosing each circuit member by a tubular portion, the tubular portion being integrally connected to an adjacent tubular portion.

8. A method of producing a circuit member-holding clamp, comprising:

passing the plurality of juxtaposed circuit members through mating surfaces of upper and lower dies mated together;

after the passing step, pouring a flexible resin material into a cavity formed by the upper and lower dies, whereby insert molding the circuit members in the flexible resin material molded in the cavity; and enclosing each circuit member by a tubular portion, the tubular portion being integrally connected to an adjacent tubular portion.

9. The circuit member-holding clamp of claim 1, wherein each of the tubular portions has a cylindrical shape.

10. The method of claim 5, wherein each of the tubular portions has a cylindrical shape.

11. The method of claim 6, wherein each of the tubular portions has a cylindrical shape.

12. The method of claim 7, wherein each of the tubular portions has a cylindrical shape.

13. The method of claim 8, wherein each of the tubular portions has a cylindrical shape.

14. The circuit member-holding clamp of claim 1, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

15. The method of claim 5, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

16. The method of claim 6, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

17. The method of claim 7, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

18. The method of claim 8, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

19. The circuit member-holding clamp of claim 3, wherein each of the tubular portions has a cylindrical shape.

20. The circuit member-holding clamp of claim 3, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

21. A method of producing a circuit member-holding clamp for securing a plurality of juxtaposed circuit members to a wall, the circuit member-holding clamp comprising a plurality of tubular portions respectively surrounding the juxtaposed circuit members, the tubular portions being integrally connected together, the method comprising:

placing the plurality of juxtaposed circuit members on a mating surface of a lower die;

pouring a flexible resin material into a cavity in the lower die; and after the pouring step, placing an upper die on the mating surface of the lower die, whereby insert molding the circuit members in the flexible resin material between the upper and lower dies, wherein the flexible resin material is a resin having hardness of approximately 60 to approximately 80 degrees according to JIS standard "JIS K6301".

22. The method of claim 21, wherein each of the tubular portions has a cylindrical shape.

23. The method of claim 21, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

24. A method of producing a circuit member-holding clamp for securing a plurality of juxtaposed circuit members to a wall, the circuit member-holding clamp comprising a plurality of tubular portions respectively surrounding the juxtaposed circuit members, the tubular portions being integrally connected together, the method comprising:

passing the plurality of juxtaposed circuit members through mating surfaces of upper and lower dies mated together; and after the passing step, pouring a flexible resin material into a cavity formed by the upper and lower dies, whereby insert molding the circuit members in the flexible resin material molded in the cavity, wherein the flexible resin material is a resin having hardness of approximately 60 to approximately 80 degrees according to JIS standard "JIS K6301".

25. The method of claim 24, wherein each of the tubular portions has a cylindrical shape.

26. The method of claim 24, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

27. A method of producing a circuit member-holding clamp, comprising:

placing a plurality of juxtaposed circuit members on a mating surface of a lower die;

pouring a flexible resin material into a cavity in the lower die; and after the pouring step, placing an upper die on the mating surface of the lower die, whereby insert molding the circuit members in the flexible resin material between the upper and lower dies, wherein the flexible resin material is a resin having hardness of approximately 60 to approximately 80 degrees according to JIS standard "JIS K6301".

28. The method of claim 27, wherein each of the tubular portions has a cylindrical shape.

29. The method of claim 27, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

30. A method of producing a circuit member-holding clamp, comprising:

passing a plurality of juxtaposed circuit members through mating surfaces of upper and lower dies mated together; and after the passing step, pouring a flexible resin material into a cavity formed by the upper and lower dies, whereby insert molding the circuit members in the flexible resin material molded in the cavity, wherein the flexible resin material is a resin having hardness of approximately 60 to approximately 80 degrees according to JIS standard "JIS K6301".

31. The method of claim 30, wherein each of the tubular portions has a cylindrical shape.

32. The method of claim 30, wherein each of the tubular portions has tubular walls, each tubular wall is partially adjacent to the tubular wall of an adjacent tubular portion, and each tubular portion is connected to the adjacent tubular portion by way of the tubular walls being connected to be overlapped.

33. A circuit member-holding clamp for securing a plurality of juxtaposed circuit members with respect to a wall, each pair of adjacent circuit members being spaced apart from one another by a distance, the circuit member-holding clamp comprising a plurality of tubular portions each extending along a respective longitudinal axis, each tubular portion encasing with material a respective circuit member, the material having a radial thickness approximately equal to the distance between each respective pair of adjacent circuit members.

34. The circuit member-holding clamp of claim 33, wherein the material comprises a resilient material.

35. The circuit member-holding clamp of claim 33, wherein the material comprises a flexible resin material.

36. The circuit member-holding clamp of claim 35, wherein the flexible resin material is molded on the circuit members in a perpendicular direction to the longitudinal axes.

37. A circuit member-holding clamp for securing a plurality of juxtaposed circuit members to a wall, the circuit member-holding clamp comprising a plurality of tubular portions each extending along a respective longitudinal axis, each tubular portion encasing a respective circuit member and having a right circular cross-section perpendicular to its respective longitudinal axis, and respective pairs of adjacent tubular portions sharing a common congruent chord.

38. The circuit member-holding clamp of claim 37, wherein the circuit member-holding clamp is formed of a flexible resin material molded on the circuit members and each tubular portion individually encloses a circuit member.

39. The circuit member-holding clamp of claim 38, wherein the flexible resin material is molded on the circuit members in a perpendicular direction to the longitudinal axes.

* * * * *